US012770902B2

(12) United States Patent
Toida

(10) Patent No.: US 12,770,902 B2
(45) Date of Patent: Oct. 20, 2026

(54) FUEL CELL SYSTEM

(71) Applicant: TOYOTA JIDOSHA KABUSHIKI KAISHA, Toyota (JP)

(72) Inventor: Masashi Toida, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 480 days.

(21) Appl. No.: 18/407,822

(22) Filed: Jan. 9, 2024

(65) Prior Publication Data

US 2024/0234765 A1 Jul. 11, 2024

(30) Foreign Application Priority Data

Jan. 11, 2023 (JP) ................................ 2023-002057

(51) Int. Cl.

| | |
|---|---|
| ***H01M 8/04089*** | (2016.01) |
| ***H01M 8/04303*** | (2016.01) |
| ***H01M 8/0438*** | (2016.01) |
| ***H01M 8/0444*** | (2016.01) |
| ***H01M 8/04746*** | (2016.01) |
| ***H01M 8/04955*** | (2016.01) |

(52) U.S. Cl.

CPC ... *H01M 8/04753* (2013.01); *H01M 8/04089* (2013.01); *H01M 8/04303* (2016.02); *H01M 8/04388* (2013.01); *H01M 8/04447* (2013.01); *H01M 8/04955* (2013.01)

(58) Field of Classification Search

None

See application file for complete search history.

(56) References Cited

FOREIGN PATENT DOCUMENTS

JP 2020205208 A 12/2020

*Primary Examiner* — Carlos Barcena

(74) *Attorney, Agent, or Firm* — Hunton Andrews Kurth LLP

(57) ABSTRACT

To provide a fuel cell system capable of suppressing deterioration of a catalyst. A fuel cell system, wherein the fuel cell system comprises a fuel cell, a fuel gas system, an oxidant gas system, a pressure sensor and a control unit; wherein the control unit is configured to supply a predetermined amount of a fuel gas to the fuel cell when the fuel cell system is stopped; and wherein the pressure sensor is configured to measure a pressure of the fuel gas present in the fuel gas system.

5 Claims, 1 Drawing Sheet

FUEL CELL SYSTEM

CROSS-REFERENCE

This application claims priority to Japanese Patent Application No. 2023-002057 filed on Jan. 11, 2023, incorporated herein by reference in its entirety.

TECHNICAL FIELD

The present disclosure relates to a fuel cell system.

BACKGROUND

Various studies have been made on fuel cells (FC). Patent Literature 1 discloses a fuel cell system in which the feed rate of the anode gas is increased when an abnormal potential is generated.

Patent Literature 1: Japanese Patent Application Laid-Open (JP-A) No. 2020-205208

When the abnormal potential is generated, deterioration of the catalyst progresses. Accordingly, there is a need for a technique that can prevent the generation of the abnormal potential.

SUMMARY

The disclosure was achieved in light of the above circumstances. An object of the disclosure is to provide a fuel cell system capable of suppressing deterioration of a catalyst.

The fuel cell system of the present disclosure is a fuel cell system,

- wherein the fuel cell system comprises a fuel cell, a fuel gas system, an oxidant gas system, a pressure sensor and a control unit;
- wherein the control unit is configured to supply a predetermined amount of a fuel gas to the fuel cell when the fuel cell system is stopped;
- wherein the pressure sensor is configured to measure a pressure of the fuel gas present in the fuel gas system;
- wherein the control unit is configured to preliminarily store a data group indicating a relationship between the pressure of the fuel gas and an introduced oxidant gas flow rate which is a flow rate of an oxidant gas leaked from the oxidant gas system and introduced into the fuel gas system through a seal of the fuel cell;
- wherein the control unit is configured to calculate the introduced oxidant gas flow rate by comparing the pressure of the fuel gas with the data group; and
- wherein, by the following formula (1), the control unit is configured to determine a supplied fuel gas amount which is the amount of the fuel gas supplied to the fuel cell when the fuel cell system is stopped:

$$\text{Qair\_seal}\ (NL/\text{min}) \times T\ (\text{min}) = \text{Vh2\_stop}\ (NL) \qquad \text{Formula (1)}$$

(where Qair_seal is the introduced oxidant gas flow rate; T is a period of stopping the fuel cell system; and Vh2_stop is the supplied fuel gas amount.)

In the fuel cell system of the present disclosure, the control unit may be configured to learn a fuel cell system usage history which is a user's usage history of the fuel cell system, and wherein the control unit may be configured to adjust the fuel cell system stopping period T based on the fuel cell system usage history.

In the fuel cell system of the present disclosure, the control unit may be configured to correct the introduced oxidant gas flow rate Qair_seal to a large value according to a degree of deterioration of the seal.

In the fuel cell system of the present disclosure, the pressure sensor may be configured to monitor a fuel gas pressure change amount which is an amount of change in the pressure of the fuel gas present in the stopped fuel gas system;

- the control unit may be configured to derive a correction coefficient of the introduced oxidant gas flow rate Qair_seal from the fuel gas pressure change amount; and
- the control unit may be configured to correct the introduced oxidant gas flow rate Qair_seal by multiplying the introduced oxidant gas flow rate Qair_seal by the correction coefficient.

In the fuel cell system of the present disclosure, the fuel cell system may further comprise a fuel gas concentration sensor;

- the fuel gas concentration sensor may be configured to monitor a fuel gas concentration change amount which is an amount of change in a concentration of the fuel gas present in the stopped fuel gas system;
- the control unit may be configured to derive a correction coefficient of the introduced oxidant gas flow rate Qair_seal from the fuel gas concentration change amount; and
- the control unit may be configured to correct the introduced oxidant gas flow rate Qair_seal by multiplying the introduced oxidant gas flow rate Qair_seal by the correction coefficient.

The present disclosure can provide the fuel cell system capable of suppressing deterioration of a catalyst.

BRIEF DESCRIPTION OF THE DRAWINGS

In the accompanying drawings.

DETAILED DESCRIPTION

Figure 1:
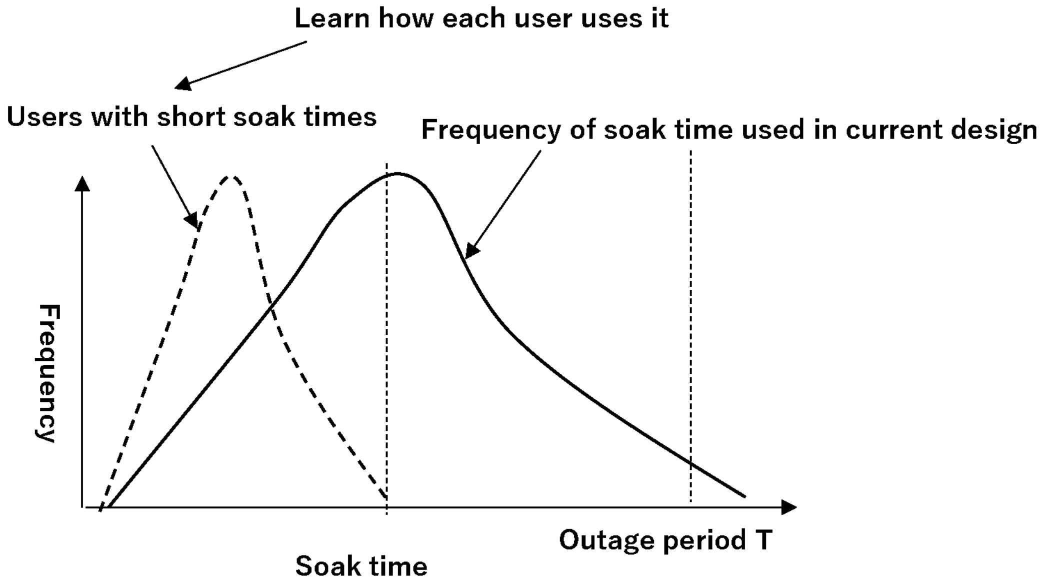
FIG. 1 is a graph showing an example of a relationship between soak time and frequency.

Hereinafter, the embodiments of the present disclosure will be described in detail. Matters that are required to implement the present disclosure (such as common fuel cell system structures and production processes not characterizing the present disclosure) other than those specifically referred to in the Specification, may be understood as design matters for a person skilled in the art based on conventional techniques in the art. The present disclosure can be implemented based on the contents disclosed in the Specification and common technical knowledge in the art.

In the Specification, "-" used to indicate a numerical range, is used to mean that the range includes the numerical values described before and after "-" as the lower and the upper limit values.

Also in the Specification, the upper and lower limit values of the numerical range may be a desired combination.

The fuel cell system of the present disclosure is a fuel cell system, wherein the fuel cell system comprises a fuel cell, a fuel gas system, an oxidant gas system, a pressure sensor and a control unit;

wherein the control unit is configured to supply a predetermined amount of a fuel gas to the fuel cell when the fuel cell system is stopped;

wherein the pressure sensor is configured to measure a pressure of the fuel gas present in the fuel gas system;

wherein the control unit is configured to preliminarily store a data group indicating a relationship between the pressure of the fuel gas and an introduced oxidant gas flow rate which is a flow rate of an oxidant gas leaked from the oxidant gas system and introduced into the fuel gas system through a seal of the fuel cell;

wherein the control unit is configured to calculate the introduced oxidant gas flow rate by comparing the pressure of the fuel gas with the data group; and wherein, by the following formula (1), the control unit is configured to determine a supplied fuel gas amount which is the amount of the fuel gas supplied to the fuel cell when the fuel cell system is stopped:

$$\text{Qair\_seal}\ (NL/\text{min}) \times T\ (\text{min}) = \text{Vh2\_stop}\ (NL) \qquad \text{Formula (1)}$$

(where Qair_seal is the introduced oxidant gas flow rate; T is a period of stopping the fuel cell system; and Vh2_stop is the supplied fuel gas amount.)

In the fuel cell system, a small amount of an oxidizing gas is mixed into a fuel gas system from the oxidizing gas system via a seal while the fuel cell system is stopped (while the vehicle is standing), an abnormal potential of the fuel cell is generated by the oxidizing gas, a carrier such as carbon in the catalyst of the fuel cell is oxidized, and the catalyst is deteriorated. Therefore, in the related art, when the fuel cell system is stopped, the deterioration of the catalyst is suppressed by adding an excessive amount of the fuel gas to the fuel cell with respect to the flow rate of the oxidant gas mixed in the predetermined stop period T. If the predetermined stopping period T is set to be, for example, 2 weeks, and the fuel gas is excessively introduced into the fuel cell, the fuel gas is wastefully introduced into the fuel cell for a user whose stopping period T is less than 2 weeks. Further, in the related art, the product variation of the seal of the fuel cell system, deterioration of the seal, and the like are not taken into consideration. In view of these, a further excess of fuel gas must be supplied to the fuel cell.

According to the present disclosure, it is possible to suppress deterioration of the catalyst during shutdown of the fuel cell system.

According to the present disclosure, it is possible to achieve both suppression of deterioration of a catalyst and improvement of fuel efficiency during stoppage of a fuel cell system.

In the present disclosure, it is possible to set the fuel gas supply amount to the fuel cell assuming the flow rate of the oxidizing gas mixed during the stoppage of the fuel cell system.

The fuel cell system of the present disclosure includes a fuel cell, a fuel gas system, an oxidant gas system, a pressure sensor, and a controller (control unit).

The fuel cell system of the present disclosure may include a cooling system and a fuel gas concentration sensor.

The fuel cell system of the present disclosure may be mounted on a moving body such as a vehicle and used. Further, the fuel cell system of the present disclosure may be mounted on a generator that supplies electric power to the outside.

The vehicle may be a fuel cell vehicle or the like. Examples of the moving body other than the vehicle include a railway, a ship, and an aircraft.

Further, the fuel cell system of the present disclosure may be mounted on a moving body such as a vehicle capable of traveling even with electric power of a secondary battery.

The vehicle may comprise the fuel cell system of the present disclosure. The moving body may include a drive unit such as a motor, an inverter, and a hybrid control system.

The hybrid control system may be capable of driving a moving body by using both the output of the fuel cell and the electric power of the secondary battery.

The fuel cell may have only one single cell, or may be a fuel cell stack that is a stacked body in which a plurality of single cells are stacked. In the present disclosure, both the single cell and the fuel cell stack may be referred to as a fuel cell.

The number of stacked single cells is not particularly limited, and may be, for example, 2 to several hundred.

A single cell of a fuel cell typically includes a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes a cathode catalyst layer and a cathode-side gas diffusion layer.

The anode (fuel electrode) includes an anode catalyst layer and an anode-side gas diffusion layer.

The cathode catalyst layer and the anode catalyst layer are collectively referred to as a catalyst layer.

The catalyst layer may include, for example, a catalyst metal that promotes an electrochemical reaction, an electrolyte having proton conductivity, a support having electron conductivity, and the like.

As the catalytic metal, for example, platinum (Pt) and an alloy composed of Pt and another metal (for example, a Pt alloy obtained by mixing cobalt, nickel, and the like) can be used.

The electrolyte may be a fluorine-based resin or the like. As the fluorine-based resin, for example, a Nafion solution or the like may be used.

The catalyst metal may be supported on a support, and in each of the catalyst layers, a support (catalyst-supported support) on which the catalyst metal is supported and an electrolyte may be mixed.

Examples of the support for supporting the catalyst metal include carbon materials such as carbon, which are generally commercially available.

The cathode-side gas diffusion layer and the anode-side gas diffusion layer are collectively referred to as a gas diffusion layer.

The gas diffusion layer may be a conductive member or the like having gas permeability.

Examples of the conductive member include a carbon porous body such as carbon cloth and carbon paper, and a metal porous body such as a metal mesh and a metal foam.

The electrolyte membrane may be a solid polymer electrolyte membrane. Examples of the solid polymer electrolyte membrane include a fluorine-based electrolyte membrane such as a thin film of perfluorosulfonic acid containing moisture, and a hydrocarbon-based electrolyte membrane.

The electrolyte membrane may be, for example, a Nafion membrane (manufactured by DuPont).

The single cell may include two separators that sandwich both surfaces of the membrane electrode gas diffusion layer assembly as needed. The two separators are one anode-side separator and the other cathode-side separator. In the present disclosure, the anode-side separator and the cathode-side separator are collectively referred to as a separator.

The separator may have holes constituting a manifold such as a supply hole and a discharge hole for allowing a fluid such as a reaction gas and a cooling medium to flow in the stacking direction of the single cells.

As the cooling medium, for example, cooling water such as a mixed solution of ethylene glycol and water can be used in order to prevent freezing at low temperatures. As the cooling medium, air for cooling can be used.

Examples of the supply hole include a fuel gas supply hole, an oxidant gas supply hole, and a cooling medium supply hole.

Examples of the discharge hole include a fuel gas discharge hole, an oxidant gas discharge hole, and a cooling medium discharge hole.

The separator may have a reaction gas flow path on a surface in contact with the gas diffusion layer. In addition, the separator may have a cooling medium flow path for keeping the temperature of the fuel cell constant on a surface opposite to the surface in contact with the gas diffusion layer.

The separator may be a gas impermeable conductive member or the like. The conductive member may be, for example, dense carbon obtained by compressing carbon to make it gas-impermeable, or a press-formed metal (for example, iron, aluminum, stainless steel, or the like) plate. In addition, the separator may have a current collecting function.

The single cell may have a frame. The frame has an opening. The opening of the frame may be in the center of the frame. The opening of the frame surrounds the membrane electrode gas diffusion layer assembly in a plan view.

The frame may have a hole serving as a manifold in a region other than the end portion and the opening portion in the plane direction in a plan view. The holes that the frame has are the same as those that the separator has.

The frame may be a structural member having adhesiveness, gas sealing, and insulating properties. The material of the frame may be, for example, a thermoplastic resin such as a polyester-based resin or a modified olefin-based resin, or a thermosetting resin that is a modified epoxy resin. The frame may be made of a rubber material having an elastic function such as EPDM (ethylene propylene diene rubber), fluorine-based rubber, or silicone-based rubber.

In the fuel cell stack, a gasket or a seal such as the frame may be disposed between the single cells so as to surround the respective holes and ensure a gas sealing property.

The fuel cell stack may include a manifold such as an inlet manifold in which the supply holes are in communication with each other and an outlet manifold in which the discharge holes are in communication.

Inlet manifolds include anode inlet manifolds, cathode inlet manifolds, and cooling medium inlet manifolds.

Outlet manifolds include anode outlet manifolds, cathode outlet manifolds, and cooling medium outlet manifolds.

In the present disclosure, the fuel gas and the oxidizing gas are collectively referred to as a reaction gas. The reaction gas supplied to the anode is a fuel gas, and the reaction gas supplied to the cathode is an oxidant gas. The fuel gas is a gas mainly containing hydrogen, and may be hydrogen. The oxidizing gas is a gas containing oxygen, and may be oxygen, air, dry air, or the like.

The oxidant gas system supplies the oxidant gas to the fuel cell.

The oxidizing gas system may include an oxidizing gas supply unit, an oxidizing gas supply flow path, an oxidizing off-gas discharge flow path, a bypass flow path, and the like.

The oxidant gas supply unit may be an air compressor or the like. The air compressor is electrically connected to the control unit, and the rotation speed of the rotor is controlled in accordance with a control signal from the control unit. The air compressor may be disposed in the oxidant gas supply flow path.

The oxidant gas supply flow path connects the outside of the fuel cell system and the cathode inlet of the fuel cell. The oxidant gas supply flow path enables the supply of the oxidant gas from the oxidant gas supply unit to the cathode of the fuel cell. The cathode inlet may be an oxidant gas supply hole, a cathode inlet manifold, or the like. In the oxidant gas supply flow path, an oxidant gas inlet sealing valve may be disposed downstream of the oxidant gas supply unit.

The oxidant gas inlet sealing valve is electrically connected to the control unit, and the oxidant gas inlet sealing valve is opened by the control unit to supply the oxidant gas to the cathode of the fuel cell. Further, the flow rate of the oxidant gas supplied to the cathode may be adjusted by adjusting the opening degree of the oxidant gas inlet sealing valve.

The oxidant off-gas discharge channel connects the cathode outlet of the fuel cell and the outside of the fuel cell system. The oxidant off-gas discharge flow path allows the oxidant off-gas, which is the oxidant gas discharged from the cathode of the fuel cell, to be discharged to the outside of the fuel cell system. The cathode outlet may be an oxidant gas outlet, a cathode outlet manifold, or the like. A pressure regulating valve may be disposed in the oxidant off-gas discharge flow path.

The pressure regulating valve is electrically connected to the outer unit, and by opening the pressure regulating valve by the control unit, the oxidant off-gas, which is the reaction oxidant gas, is discharged from the oxidant off-gas discharge passage to the outside of the fuel cell system. Further, the pressure of the oxidizing gas (cathode pressure) supplied to the cathode may be adjusted by adjusting the opening degree of the pressure regulating valve. Note that the oxidizing agent off-gas may be the same as the component of the oxidizing agent gas, may be oxygen, air, dry air, or the like, and may contain water vapor or the like.

The bypass flow path connects the oxidant gas supply flow path and the oxidant off-gas discharge flow path, and bypasses the fuel cell. The bypass flow path branches from the oxidant gas supply flow path at a branch portion downstream of the oxidant gas supply portion of the oxidant gas supply flow path, bypasses the fuel cell, and merges with the oxidant off-gas discharge flow path at a merging portion downstream of the pressure regulating valve of the oxidant off-gas discharge flow path.

A bypass valve may be disposed in the bypass flow path. The bypass valve may be a valve or the like capable of adjusting an opening degree, or may be a three-way valve for oxidizing gas. In the case of the three-way valve for oxidant gas may be disposed in the branch portion which is the most upstream of the bypass flow path, also serves as an oxidant gas inlet sealing valve.

The bypass valve is electrically connected to the control unit, and when the bypass valve is opened by the control unit, at least a part of the oxidant gas can be supplied to the oxidant off-gas discharge flow path by bypassing the fuel cell. In the case where the bypass valve is a three-way valve for an oxidant gas, when the supply of the oxidant gas to the fuel cell is not necessary or the like, the valve on the downstream side of the oxidant gas supply flow path of the bypass valve is closed by the control unit so that the flow of the oxidant gas becomes the bypass flow path from the oxidant gas supply flow path, and the valve on the side of the bypass flow path is opened, whereby the total amount of the oxidant gas can be supplied to the oxidant off-gas discharge flow path.

The oxidizing gas system may include a cooler (inter-cooler) downstream of the oxidizing gas supply unit of the oxidizing gas supply channel. The cooler may be disposed downstream of the oxidant gas supply portion of the oxidant gas supply flow path and upstream of the branch portion with respect to the bypass flow path.

The cooler may exhibit a cooling function by circulating a cooling medium of the cooling system in and out of the cooler.

The fuel gas system supplies fuel gas to the fuel cell.

The fuel gas system may include a fuel gas supply part, a fuel gas supply passage, a fuel off-gas discharge passage, a circulation passage, an ejector, a pressure sensor, a fuel gas concentration sensor, and the like.

Examples of the fuel gas supply unit include a fuel tank and the like, and specific examples thereof include a liquid hydrogen tank and a compressed hydrogen tank.

The fuel gas supply flow path connects the fuel gas supply unit and the anode inlet of the fuel cell. The fuel gas supply flow path enables the supply of the fuel gas containing hydrogen to the anode of the fuel cell. The anode inlet may be a fuel gas supply hole, an anode inlet manifold, or the like.

The fuel off-gas discharge flow path connects the anode outlet of the fuel cell and the outside of the fuel cell system. The anode outlet may be a fuel gas outlet hole, an anode outlet manifold, or the like.

The fuel off-gas may include the fuel gas that has passed unreacted at the anode and the moisture generated at the cathode that has reached the anode. The fuel off-gas may include a corrosive material generated in the catalyst layer, the electrolyte membrane, and the like, and an oxidant gas that may be supplied to the anode during scavenging.

The circulation flow path branches off from the fuel off-gas discharge flow path at a branch portion of the fuel off-gas discharge flow path, merges with the fuel gas supply flow path at a merging portion of the fuel gas supply flow path, and circulates the fuel off-gas as a circulation gas in the fuel gas system.

The ejector may be disposed at a junction of the fuel gas supply flow path.

A fuel gas inlet sealing valve may be disposed upstream of the ejector.

The fuel gas inlet sealing valve is electrically connected to the control unit, and the fuel gas inlet sealing valve is opened by the control unit to supply the fuel gas to the anode of the fuel cell. Further, the flow rate of the fuel gas supplied to the anode may be adjusted by adjusting the opening degree of the fuel gas inlet sealing valve. The fuel gas inlet sealing valve may be a linear solenoid valve or the like.

An anode gas-liquid separator and an exhaust drain valve may be disposed at a branch portion of the fuel off-gas discharge flow path. The exhaust drain valve is electrically connected to the control unit, and the opening and closing of the exhaust drain valve is controlled by the control unit.

The fuel cell system may comprise a cooling system.

The cooling system regulates the temperature of the fuel cell.

The cooling system may have a cooling medium flow path.

The coolant flow path allows the coolant to circulate in and out of the fuel cell. The cooling medium flow path communicates with the cooling medium supply hole and the cooling medium discharge hole provided in the fuel cell, and allows the cooling medium to be circulated inside and outside the fuel cell.

A cooling medium supply unit may be provided in the cooling medium flow path. The cooling medium supply unit is electrically connected to the control unit. The cooling medium supply unit is driven in accordance with a control signal from the control unit. The control unit controls a flow rate of the cooling medium supplied from the cooling medium supply unit to the fuel cell. Thus, the temperature of the fuel cell is controlled. Examples of the cooling medium supply unit include a cooling water pump.

A radiator that dissipates heat of the cooling medium may be provided in the cooling medium flow path.

A reserve tank for storing a cooling medium may be provided in the cooling medium flow path.

The fuel cell system may comprise a battery.

The battery (secondary battery) may be any battery that can be charged and discharged, and examples thereof include a nickel-hydrogen secondary battery and a conventionally known secondary battery such as a lithium-ion secondary battery. The secondary battery may include a power storage element such as an electric double layer capacitor. The secondary battery may have a configuration in which a plurality of the secondary batteries are connected in series. The secondary battery supplies electric power to an oxidant gas supply unit or the like. The secondary battery may be rechargeable from an external power source of the vehicle, such as a household power source, for example. The secondary battery may be charged by the output of the fuel cell. The charging and discharging of the secondary battery may be controlled by the control unit.

The pressure sensor measures the pressure of the fuel gas in the fuel gas system.

The pressure sensor may monitor a variation in fuel gas pressure, which is a change in pressure of the fuel gas in the fuel gas system of the fuel cell system during shutdown.

The pressure sensor may be disposed in the fuel gas supply flow path.

The pressure sensor is electrically connected to the controller. The control unit detects the pressure of the fuel gas acquired by the pressure sensor.

The fuel gas concentration sensor monitors the concentration of the fuel gas in the fuel gas system.

The fuel gas concentration sensor may monitor an amount of variation in the fuel gas concentration, which is an amount of change in the concentration of the fuel gas in the fuel gas system of the fuel cell system during shutdown.

The fuel gas concentration sensor may be disposed in the fuel gas supply flow path.

The fuel gas concentration sensor is electrically connected to the controller. The controller detects the concentration of the fuel gas acquired by the fuel gas concentration sensor.

The fuel gas concentration sensor may be a hydrogen concentration sensor.

The control unit physically includes, for example, an arithmetic processing unit such as a CPU (central processing unit), a ROM (read-only memory) that stores control programs processed by CPU, control data, and the like, a storage device such as a RAM (random access memory) that is mainly used as various working areas for the control processing, and an input/output interface. The control unit may be, for example, a control device such as a power control unit (PCU) and an electronic control unit (ECU: Electronic Control Unit).

The control unit may be electrically connected to an ignition switch that may be mounted on the vehicle. The control unit may be operable by an external power source even when the ignition switch is turned off.

First Embodiment

The control unit supplies a predetermined amount of fuel gas to the fuel cell when the fuel cell system is stopped. The supply of the fuel gas may be performed by a fuel gas supply unit.

The control unit stores in advance a data group indicating a relationship between the pressure of the fuel gas and the flow rate of the mixed oxide gas, which is the flow rate of the oxidant gas leaked from the oxidant gas system and mixed into the fuel gas system via the seal of the fuel cell.

The control unit calculates the flow rate of the mixed oxidant gas by comparing the pressure of the fuel gas with the data group.

The controller determines a supply fuel gas amount, which is the predetermined amount of the fuel gas supplied to the fuel cell when the fuel cell system is stopped, according to the following formula (1).

$$\text{Qair\_seal}\ (NL/\text{min}) \times T\ (\text{min}) = \text{Vh2\_stop}\ (NL) \qquad \text{Formula (1)}$$

(where Qair_seal is the introduced oxidant gas flow rate; T is a period of stopping the fuel cell system; and Vh2_stop is the supplied fuel gas amount.)

Second Embodiment

The control unit may learn a usage history of the fuel cell system (hereinafter referred to as a usage history) which is a usage history of the fuel cell system of the user.

The controller may adjust the fuel cell system shutdown period T (hereinafter referred to as "shutdown period T") based on the fuel cell system usage history.

The stop period T may be set based on statistical data of how the vehicle is used by the user.

The stop period T may be a time period from when the fuel cell system is stopped until when it is started again. IG-OFF may be the same as when the fuel-cell system is shut down. After IG-OFF, the fuel-cell system may be shut down. The stopping treatment may include a scavenging process, an oxygen consumption process, a fuel gas pressurizing process, a sealing process, and the like. In the fuel gas pressurizing process, the fuel gas of the amount of the supplied fuel gas may be supplied to the fuel cell.

The stop period T may be a soak time. The soak time may be a time period from when the fuel-cell system is stopped until the next time the key-switch is turned ON.

FIG. 1 is a graph illustrating an example of a relationship between soak time and frequency.

The initial value of the stop period T may be 2 weeks as a soak time that can cover the usage of 99.7% of the user by the statistical data, for example. However, depending on the user of the vehicle equipped with the fuel cell system, there is a case in which the stop period T is short, and the user wastefully consumes the fuel gas. On the other hand, when the stop period T is long, the fuel gas is insufficient and the catalyst deteriorates. Therefore, the control unit may learn the stop period T from the usage history, which is the actual usage of the vehicle equipped with the fuel cell system by the user. The control unit learns how to use the vehicle of the user, and corrects the stop period T, thereby adjusting the supply amount of the fuel gas to the fuel cell when the next and subsequent fuel cell systems are stopped, thereby improving the fuel efficiency of the fuel cell system.

Figure 2:
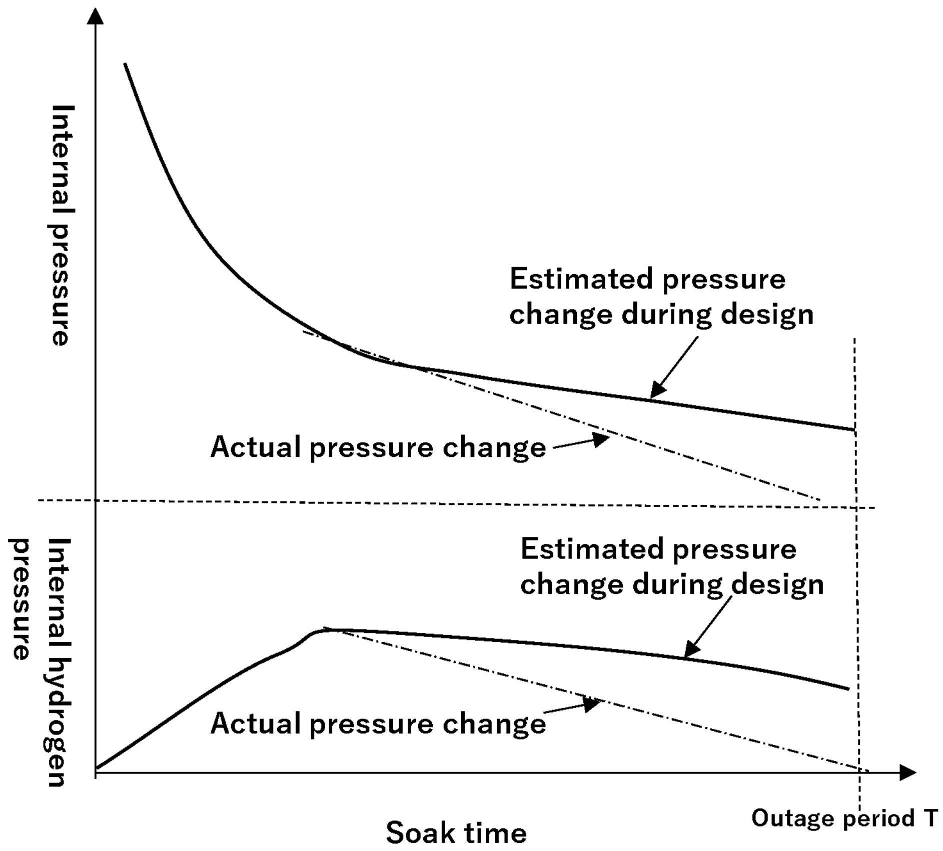
FIG. 2 is a graph illustrating an example of a relationship between soak time and internal pressure/internal hydrogen pressure of a fuel cell system.

FIG. 2 is a graph illustrating an example of a relationship between soak time and internal pressure/internal hydrogen pressure of a fuel cell system.

The pressure inside the fuel cell system is reduced by the temperature inside the fuel cell system and the gas exchange between the cathode and the anode.

When air is used as the oxidant gas and hydrogen is used as the fuel gas, hydrogen, nitrogen, and water exist inside the fuel cell system after a certain period of time has elapsed from the start of the soak. As air is entrained from the seal, hydrogen is consumed, so that the pressure inside the fuel cell system and the pressure of hydrogen inside the fuel cell system fall faster than the expected pressure change during design due to product variation and degradation. Therefore, the stop period T may be set within a range in which the deterioration of the catalyst can be suppressed in consideration of the deterioration degree of the seal.

Third Embodiment

The controller may correct the mixed oxidant gas flow rate Qair_seal to a large value according to the degree of deterioration of the seal.

The flow rate of the mixed oxidant gas varies due to product variation of the seal and deterioration of the seal. The degree of deterioration of the seal varies depending on the product variation. Therefore, the control unit learns the degree of deterioration of the seal, and corrects the mixed oxidant gas flow rate to a large value in accordance with the degree of deterioration of the seal, thereby deriving an optimum supply fuel gas amount when the next and subsequent fuel cell systems are stopped, and thus it is possible to achieve both suppression of deterioration of the catalyst and improvement of fuel efficiency.

Fourth Embodiment

The controller may derive a correction coefficient of the mixed oxidant gas flow rate Qair_seal from the fuel gas pressure change amount.

The controller may correct the mixed oxide gas flow rate Qair_seal by multiplying the mixed oxidant gas flow rate Qair_seal by the correction coefficient.

A method of learning the degree of deterioration of the seal when air is used as the oxidant gas and hydrogen is used as the fuel gas will be described below.

As a learning method, the amount of change in the fuel gas pressure during the stoppage of the fuel cell system is monitored, and when the pressure change is larger than expected, it is determined that the amount of air mixed is large, and the excess hydrogen supply amount is increased.

According to PV=nRT, the amount of hydrogen and the amount of nitrogen in the fuel cell can be calculated as the molar amount n from the pressure of the fuel gas. The fuel gas pressure variation amount after a predetermined temperature range and a predetermined time elapse is monitored, and the control unit stores the fuel gas pressure change amount. The mixed oxidant gas flow rate can be calculated from the fuel gas pressure change amount by the state equation of the gas.

The amount of hydrogen in the fuel cell system is consumed with respect to the amount of air mixed as the oxidizing gas. Therefore, when the amount of air mixed is large, the amount of change in the fuel gas pressure increases. The rate of variation is calculated from the difference between the expected fuel gas pressure change amount at the time of design and the actual fuel gas pressure change amount, and the rate of change is used as a correction factor. The mixed oxide gas flow rate is corrected by multiplying the mixed oxidant gas flow rate by the correction factor. This increases the amount of supplied fuel gas when the next and subsequent fuel cell systems are stopped. Accordingly, an appropriate amount of the supplied fuel gas can be controlled.

Fifth Embodiment

The controller may derive a correction coefficient of the mixed oxidant gas flow rate Qair_seal from the fuel gas concentration change amount.

The controller may correct the mixed oxide gas flow rate Qair_seal by multiplying the mixed oxidant gas flow rate Qair_seal by the correction coefficient.

When the fuel gas concentration sensor is a hydrogen concentration sensor, the hydrogen concentration sensor can calculate the partial pressure of hydrogen in the fuel gas system of the fuel cell system during shutdown. The hydrogen concentration change amount after a predetermined temperature range and a predetermined time elapse is monitored, and the control unit stores the hydrogen concentration change amount. The mixed oxidant gas flow rate can be calculated from the hydrogen concentration change amount by the state equation of the gas. The rate of variation is calculated from the difference between the expected amount of change in hydrogen concentration at the time of design and the actual amount of change in hydrogen concentration, and the rate of change is used as a correction factor. The mixed oxide gas flow rate is corrected by multiplying the mixed oxidant gas flow rate by the correction factor. This increases the amount of supplied fuel gas when the next and subsequent fuel cell systems are stopped. Accordingly, an appropriate amount of the supplied fuel gas can be controlled.

In the oxygen consumption process in the shutdown process of the fuel cell system, it may be difficult to set the oxygen in the oxidant gas system to zero, and therefore, the amount of the supplied fuel gas may be an amount that ensures the amount of remaining oxygen and the flow rate of the mixed oxidant gas. Therefore, the flow rate of the mixed oxidant gas in the above formula (1) may include the amount of residual oxygen. The supply fuel gas amount calculated from the above formula (1) may include the amount of fuel gas consumed by reacting with the remaining oxygen.

The invention claimed is:

1. A fuel cell system, wherein the fuel cell system comprises a fuel cell, a fuel gas system, an oxidant gas system, a pressure sensor and a control unit;

wherein the control unit is configured to supply a predetermined amount of a fuel gas to the fuel cell when the fuel cell system is stopped;

wherein the pressure sensor is configured to measure a pressure of the fuel gas present in the fuel gas system;

wherein the control unit is configured to preliminarily store a data group indicating a relationship between the pressure of the fuel gas and an introduced oxidant gas flow rate which is a flow rate of an oxidant gas leaked from the oxidant gas system and introduced into the fuel gas system through a seal of the fuel cell;

wherein the control unit is configured to calculate the introduced oxidant gas flow rate by comparing the pressure of the fuel gas with the data group; and wherein, by the following formula (1), the control unit is configured to determine a supplied fuel gas amount which is the amount of the fuel gas supplied to the fuel cell when the fuel cell system is stopped:

$$\text{Qair\_seal}\ (NL/\text{min}) \times T\ (\text{min}) = \text{Vh2\_stop}\ (NL) \qquad \text{Formula (1)}$$

(where Qair_seal is the introduced oxidant gas flow rate; T is a period of stopping the fuel cell system; and Vh2_stop is the supplied fuel gas amount).

2. The fuel cell system according to claim 1, wherein the control unit is configured to learn a fuel cell system usage history which is a user's usage history of the fuel cell system, and wherein the control unit is configured to adjust the fuel cell system stopping period T based on the fuel cell system usage history.

3. The fuel cell system according to claim 1, wherein the control unit is configured to correct the introduced oxidant gas flow rate Qair_seal to a large value according to a degree of deterioration of the seal.

4. The fuel cell system according to claim 3, wherein the pressure sensor is configured to monitor a fuel gas pressure change amount which is an amount of change in the pressure of the fuel gas present in the stopped fuel gas system;

wherein the control unit is configured to derive a correction coefficient of the introduced oxidant gas flow rate Qair_seal from the fuel gas pressure change amount; and wherein the control unit is configured to correct the introduced oxidant gas flow rate Qair_seal by multiplying the introduced oxidant gas flow rate Qair_seal by the correction coefficient.

5. The fuel cell system according to claim 3, wherein the fuel cell system further comprises a fuel gas concentration sensor;

wherein the fuel gas concentration sensor is configured to monitor a fuel gas concentration change amount which is an amount of change in a concentration of the fuel gas present in the stopped fuel gas system;

wherein the control unit is configured to derive a correction coefficient of the introduced oxidant gas flow rate Qair_seal from the fuel gas concentration change amount; and wherein the control unit is configured to correct the introduced oxidant gas flow rate Qair_seal by multiplying the introduced oxidant gas flow rate Qair_seal by the correction coefficient.

* * * * *